United States Patent
Tanaka (10) Patent No.: US 10,031,406 B2
(45) Date of Patent: Jul. 24, 2018

(54) IMAGE PROJECTION APPARATUS AND METHOD OF CONTROLLING IMAGE PROJECTION APPARATUS

(71) Applicant: CANON KABUSHIKI KAISHA, Tokyo (JP)

(72) Inventor: Junichi Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 14/677,576

(22) Filed: Apr. 2, 2015

(65) Prior Publication Data

US 2015/0286123 A1 Oct. 8, 2015

(30) Foreign Application Priority Data

Apr. 4, 2014 (JP) .................................. 2014-077917

(51) Int. Cl.
*G03B 21/20* (2006.01)
*H04N 9/31* (2006.01)
*G03B 21/00* (2006.01)

(52) U.S. Cl.
CPC ..... *G03B 21/2053* (2013.01); *G03B 21/2013* (2013.01); *H04N 9/3105* (2013.01);
(Continued)

(58) Field of Classification Search
CPC .. G03B 21/005; G03B 21/14; G03B 21/2053; G03B 21/00; G03B 21/16; H04N 5/74
(Continued)

(56) References Cited

U.S. PATENT DOCUMENTS

2006/0268241 A1* 11/2006 Watson ................... H01S 5/141
353/94
2007/0252918 A1* 11/2007 Furuya ................. H04N 9/3129
348/742
(Continued)

FOREIGN PATENT DOCUMENTS

JP 2005221569 A 8/2005
JP 2005316441 A * 11/2005 ............. G03B 21/16
(Continued)

OTHER PUBLICATIONS

Machine Translation of JP 2005316441 A.*
Office Action issued in Japanese Application No. 2014-077917 dated Mar. 6, 2018.

*Primary Examiner* — Steven H Whitesell Gordon
*Assistant Examiner* — Jerry Brooks
(74) *Attorney, Agent, or Firm* — Rossi, Kimms & McDowell LLP (57) ABSTRACT

The image projection apparatus includes a light modulator configured to perform modulation of light based on an image signal, a projection optical system configured to project the light modulated by the light modulator, an illumination optical system configured to illuminate multiple divided illumination areas of the light modulator, multiple light source units provided corresponding to the divided illumination areas, a light source controller configured to control light quantities of the respective light source units so as to change illuminances of the divided illumination areas independently, and a light detector configured to detect a non-projection light component that is not projected through the projection optical system. The light source controller is configured to control the light quantities of the respective light source units depending on the image signal and a detection result of the non-projection light component by the light detector.

10 Claims, 6 Drawing Sheets (52) U.S. Cl.
CPC ......... *H04N 9/3155* (2013.01); *H04N 9/3164* (2013.01); *H04N 9/3194* (2013.01); *G03B 21/005* (2013.01)

(58) Field of Classification Search
USPC ..................................................... 353/31, 94
See application file for complete search history.

(56) References Cited

U.S. PATENT DOCUMENTS

| | | | |
|---|---|---|---|
| 2011/0205498 A1* | 8/2011 | Brown | G09G 3/02 353/31 |
| 2011/0292307 A1* | 12/2011 | Yagi | H04N 9/3126 349/8 |
| 2012/0236212 A1* | 9/2012 | Itoh | G02B 3/005 348/744 |

FOREIGN PATENT DOCUMENTS

| | | | |
|---|---|---|---|
| JP | 2006113229 A | 4/2006 |
| JP | 2006201792 A | 8/2006 |
| JP | 2008003270 A | 1/2008 |
| JP | 2008257119 A | 10/2008 |
| JP | 2012043700 A | 3/2012 |
| JP | 2012155268 A | 8/2012 |
| WO | 2012053167 A1 | 4/2012 |

* cited by examiner

| 5c: LIGHTING | 5c: LIGHTING | 5c: UNLIGHTING | 5c: UNLIGHTING |
| 5a: LIGHTING | 5a: UNLIGHTING | 5a: LIGHTING | 5a: UNLIGHTING |
| 5b: LIGHTING | 5b: UNLIGHTING | 5b: UNLIGHTING | 5b: LIGHTING |

FIG. 5A    FIG. 5B    FIG. 5C    FIG. 5D

| 5c: LIGHTING | 5c: UNLIGHTING | 5c: LIGHTING | 5c: LIGHTING |
| 5a: LIGHTING | 5a: LIGHTING | 5a: UNLIGHTING | 5a: LIGHTING |
| 5b: LIGHTING | 5b: LIGHTING | 5b: LIGHTING | 5b: UNLIGHTING |

IMAGE PROJECTION APPARATUS AND METHOD OF CONTROLLING IMAGE PROJECTION APPARATUS

BACKGROUND OF THE INVENTION

Field of the Invention

The present invention relates to an image projection apparatus such as a projector, and particularly to an image projection apparatus using a semiconductor light-emitting element as a light source.

Description of the Related Art

An image projection apparatus using, as a light source, a semiconductor light-emitting element such as an LED or a semiconductor laser requires using multiple semiconductor light-emitting elements in order to project an image having a sufficient brightness. However, the semiconductor light-emitting element has a characteristic in which its light emission quantity (luminance) and its main light emission wavelength are fluctuated depending on its temperature, an operating environment temperature, a driving current for light emission and the like. For this reason, when the multiple semiconductor light-emitting elements are used, variations in the above fluctuation of the individual semiconductor light-emitting elements results in luminance unevenness in the projected image and influences on colors in the projected image.

Japanese Patent Laid-Open No. 2012-155268 discloses, as a method to be used for a light source unit including multiple semiconductor light-emitting elements, a method of providing temperature sensors at multiple positions in a cooling path, classifying the light-emitting elements on a basis of detection results of the sensors and controlling light quantities (light emission intensities) of the light-emitting elements. Japanese Patent Laid-Open No. 2008-003270 discloses a method of providing a light separation portion to a condenser lens disposed between a color combination optical system and a rod integrator, causing part of an illumination light to exit from the light separation portion to outside of an effective area, providing a detection element that detects an intensity of the exiting light, and controlling light quantities of light-emitting elements on a basis of a detection result of the detection element.

However, the method disclosed in Japanese Patent Laid-Open No. 2012-155268 requires, when number of the semiconductor light-emitting elements is increased to provide a higher luminance, increasing number of the temperature sensors in order to detect a temperature distribution in the light source unit with high accuracy.

On the other hand, the method disclosed in Japanese Patent Laid-Open No. 2008-003270 requires an optical component to constitute the light separation portion, which results in an increase in size of the apparatus. Furthermore, the apparatus uses the part of the illumination light to detect the light quantity of the light-emitting element, which results in an inevitable decrease in a brightness of the projected image.

SUMMARY OF THE INVENTION

The present invention provides an image projection apparatus capable of suppressing a variation in light quantity among light sources without a decrease in detection accuracy for a light emission condition of each light source, an increase in size of the apparatus and a decrease in brightness of a projected image. The present invention further provides a method of controlling the apparatus.

The present invention provides as an aspect thereof an image projection apparatus including a light modulator configured to perform modulation of light based on an image signal, a projection optical system configured to project the light modulated by the light modulator, an illumination optical system configured to illuminate multiple divided illumination areas of the light modulator, multiple light source units provided corresponding to the divided illumination areas, a light source controller configured to control light quantities of the light source units so as to change illuminances of the divided illumination areas independently, and a light detector configured to detect a non-projection light component that is not projected through the projection optical system. The light source controller is configured to control the light quantities of the respective light source units depending on the image signal and a detection result of the non-projection light component by the light detector.

The present invention provides as another aspect thereof a method of controlling an image projection apparatus. The apparatus includes a light modulator configured to perform modulation of light based on an image signal, a projection optical system configured to project the light modulated by the light modulator, an illumination optical system configured to illuminate multiple divided illumination areas of the light modulator, and multiple light source units provided corresponding to the divided illumination areas. The method is to control light quantities of the light source units so as to change illuminances of the divided illumination areas independently. The method includes detecting a non-projection light component that is not projected through the projection optical system, and controlling the light quantities of the respective light source units depending on the image signal and a detection result of the non-projection light component.

Further features of the present invention will become apparent from the following description of exemplary embodiments (with reference to the attached drawings).

DESCRIPTION OF THE EMBODIMENTS

Exemplary embodiments of the present invention will be described below with reference to the attached drawings.

Embodiment 1

Figure 1:
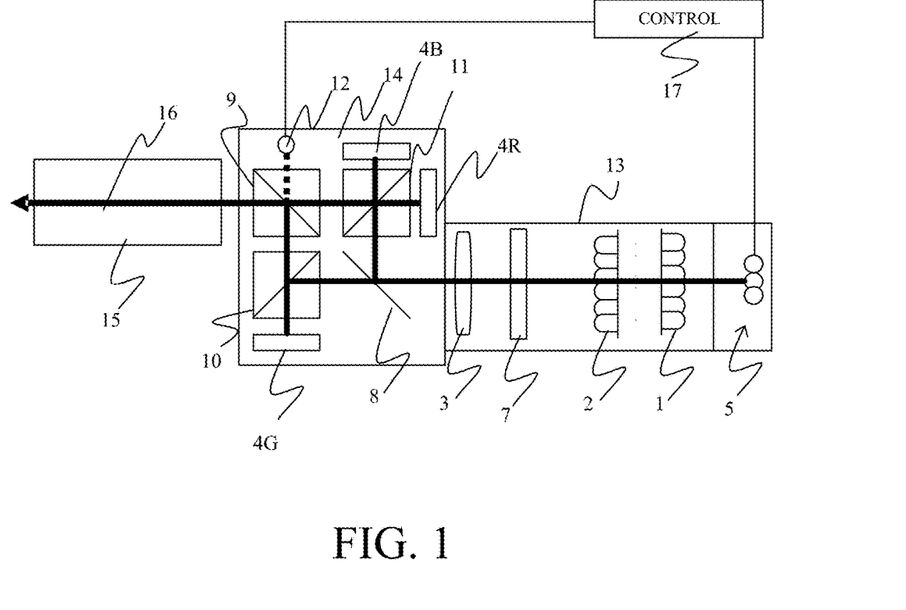
FIG. 1 illustrates a configuration of a projector that is Embodiment 1 of the present invention.

FIG. 1 illustrates a configuration of a projector as an image projection apparatus that is a first embodiment (Embodiment 1) of the present invention. The projector includes a light source 5, an illumination optical system 13, a color separation/combination optical system 14, a projection optical system 15, an illuminance sensor 12 and a controller 17 serving as a light source controller.

Light (white light) emitted from a light source 5 passes through a first fly-eye lens 1 of the illumination optical system 13 to be divided into multiple light fluxes. The multiple light fluxes enter a second fly-eye lens 2 and are then converted by a polarization conversion element 7 into light fluxes having a predetermined polarization direction. Furthermore, the divided light fluxes pass through a condenser lens 3 to exit from the illumination optical system 13, and each of the divided light fluxes is separated by a color separation/combination optical system 14 into a green light (G light), a red light (R light) and a blue light (B light). The condenser lens 3 condenses divided light fluxes of each of the G light, the R light and the B light toward multiple (arbitrary number of) divided illumination areas of each of a G-light modulator 4G, an R-light modulator 4R and a B-light modulator 4B, which will be described later.

Each of the light modulators is an element to modulate an entering light, such as a liquid crystal panel or a digital micromirror device and is disposed at an illumination surface onto which the illumination optical system 13 introduces the light (illumination light flux) from the light source 5. Although in this embodiment a reflective liquid crystal panel is used as the light modulator, a transmissive liquid crystal panel may be alternatively used. The controller 17 drives the R-, G- and B-light modulators 4R, 4G and 4B, in response to R, G and B image signals (input image) input from outside of the projector, to modulate the R, G and B lights.

In the color separation/combination optical system 14, the white light from the illumination optical system 13 is separated by a dichroic mirror 8 into the G light and an RB light. The G light transmitted through the dichroic mirror 8 is reflected at a G-polarization beam splitter 10 and subjected to light modulation by the G-light modulator 4G based on the G image signal to exit therefrom as a G image light. The G image light exiting from the G-light modulator 4G is transmitted through the G-polarization beam splitter 10 and then enters a color combination prism 9. The "image light" is a light needed to be projected onto a projection surface such as a screen to display a projected image based on the image signal.

Of the RB light reflected by the dichroic mirror 8, the R light is reflected at an RB-polarization beam splitter 11 and subjected to light modulated by the R-light modulator 4R based on the R image signal to exit therefrom as an R image light. The R image light exiting from the R-light modulator 4R is transmitted through the RB-polarization beam splitter 11 and then enters the color combination prism 9. On the other hand, the B light of the RB light is transmitted through the RB-polarization beam splitter and subjected to light modulation by the B-light modulator 4B based on the B image signal to exit therefrom as a B image light. The B image light exiting from the B-light modulator 4B is reflected at the R/B-light-polarizing beam splitter 11 and then enters the color combination prism 9.

The G image light is reflected by the color combination prism 9, and the R and B image lights are transmitted through the color combination prism 9. The R, G and B image lights thus combined are projected through the projection optical system 15 onto the screen (not illustrated) to display a projected image. In FIG. 1, an optical path 16 of the light (projection light) used for the above-described image projection is illustrated with a bold solid line.

Although a most part of the G light traveling from the G-light modulator 4G toward the projection optical system 15 is reflected by the color combination prism 9, a remaining part of the G light is transmitted through the color combination prism 9 to become a leakage light. On the other hand, although most parts of the R and B lights traveling from the R- and B-light modulators 4R and 4B toward the projection optical system 15 are transmitted through the color combination prism 9, remaining parts thereof are reflected by the color combination prism 9 to become leakage lights.

FIG. 1 collectively illustrates the leakage lights with a bold dotted line. These leakage lights each correspond to a non-projection light component which is not projected through the projection optical system 15, that is, which is not used for the image projection. In this embodiment, the leakage lights are received by the illuminance sensor (light detector) 12. The illuminance sensor 12 detects an illuminance of the R, G and B leakage lights. The illuminance of the R, G and B leakage lights is hereinafter referred to as "a leakage light illuminance". The illuminance can be rephrased as a light intensity or a light quantity.

The controller 17 acquires, on a basis of a detection result of the leakage light illuminance from the illuminance sensor 12, information on light quantities of respective multiple light source units (described later) included in the light source 5 and controls the light quantities (that is, light emission intensities) of the respective light source units depending on the acquired information. The light quantity control based on the detection result of the leakage light illuminance will be described in detail later.

Figure 7A:
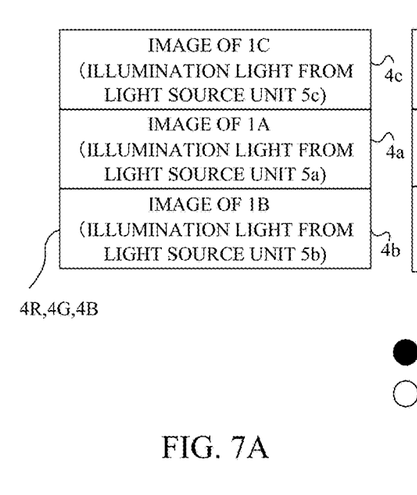
FIG. 7A illustrates three illumination areas in the projector of Embodiment 1.

FIG. 7A illustrates multiple (three in this embodiment) divided illumination areas 4a, 4b and 4c formed on each light modulator (4R, 4G and 4B) viewed from a light entrance/exit direction with respect thereto. The light modulator has a rectangular shape whose shorter sides extend in an up/down direction (shorter side direction) and whose longer sides extend in a left/right direction. The three divided illumination areas 4a, 4b and 4c are arranged in a vertical scan direction corresponding to the shorter side direction. In the drawing, the divided illumination areas 4c, 4a and 4b are arranged in this order in the vertical scan direction. In the following description, the vertical scan direction is referred to also as "an area division direction" of the divided illumination areas 4a, 4b and 4c.

Figure 7B:
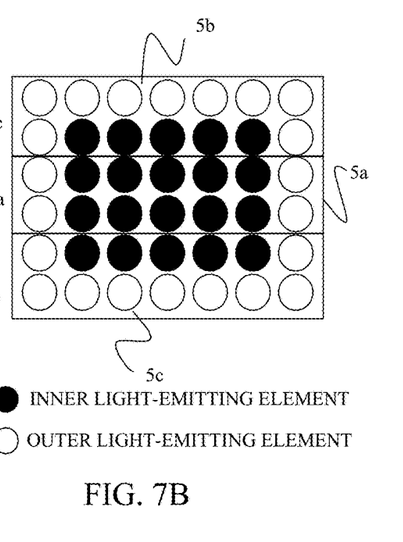
FIG. 7B illustrates arrangement of light-emitting elements in light sources units corresponding to the three illumination areas.

On the other hand, FIG. 7B illustrates an arrangement of multiple light source units 5a, 5b and 5c in the light source 5 viewed from an opposite direction to an exit direction of the light from the light source 5. The light source 5 includes the multiple (three) light source units 5a, 5b and 5c in a direction corresponding to the vertical scan direction in which the divided illumination areas 4a, 4b and 4c are arranged. In the drawing, the light source units 5b, 5a and 5c are arranged in this order from an upper side toward a lower side, that is, in a direction in which a horizontal scan of the light modulator proceeds.

An example illustrated in FIG. 7B, each of the light source units 5a, 5b and 5c includes a total of 14 light-emitting elements (shown by white-filled circles and black-filled circles) arranged in two rows in the direction corresponding to the vertical scan direction with each row including seven elements in a direction corresponding to a horizontal scan direction. However, each light source unit may be constituted alternatively by a single light-emitting element (for example, a surface light-emitting element).

In FIG. 1, light emitted from each light-emitting element of the light source unit 5a is introduced by the illumination optical system 13 to the divided illumination area 4a on each light modulator. Light emitted from each light-emitting element of the light source unit 5b is introduced by the illumination optical system 13 to the divided illumination area 4b on each light modulator. Light emitted from each light-emitting element of the light source unit 5c is introduced by the illumination optical system 13 to the divided illumination area 4c on the light modulator. In FIG. 7A, "IMAGE OF 1A", "IMAGE OF 1B" and "IMAGE OF 1C" written in the divided illumination areas 4a, 4b and 4c respectively show light source images formed by lights respectively passing through lens cells 1A, 1B and 1C (see FIGS. 2 and 3) of the first fly-eye lens 1 in the illumination optical system 13.

As just described, the illumination optical system 13 of this embodiment (whose configuration will be described in detail below) illuminates the three divided illumination areas on each light modulator respectively with three illumination light fluxes emitted from the three light source units 5a, 5b and 5c. That is, differently from conventional illumination optical systems uniformly illuminating an entire surface of a light modulator with an illumination light flux from a single light source such as a light source lamp, the illumination optical system 13 of this embodiment uniformly illuminates the divided illumination areas respectively with the illumination light fluxes emitted from the light source units. Accordingly, even while the light modulator is driven in response to the image signal to perform the light modulation (that is, even while the image projection is performed), it is possible to detect, by the illuminance sensor 12, the leakage light illuminance as information on an illumination light flux emitted from each light source unit (5a, 5b and 5c).

Next, description will be made of a characteristic of the illumination optical system 13 in this embodiment. For projectors, a hold-type display element such as a liquid crystal panel serving as a light modulator that performs light modulation based on an image signal is often used. Use of such a hold-type display element, however, generates so-called "sample-and-hold blur" (motion blur). The sample-and-hold blur is generated, during display of a moving image including a moving object on the hold-type display element, as a result of a difference between a person observing the moving image with his/her eyes tracing the object while predicting a moving direction of the object and the hold-type display element keeps displaying a same frame image for one frame period (1/60 second). That is, the person perceives a difference between a trace position of the eyes and a position of the object being displayed in the moving image, as image blur.

As a solution to reduce such sample-and-hold blur, Japanese Patent Laid-Open No. 11-202285 discloses a method of dividing a display screen of a liquid crystal display apparatus equipped with backlights into multiple areas in a vertical scan direction and sequentially lighting and unlighting the backlights for the divided areas so as to limit an image display time to a period of time close to an image writing time for a liquid crystal panel. This method is a commonly known method as a black insertion method. On the other hand, Japanese Patent Laid-Open No. 2006-308720 discloses, as another solution for a projector, a method of forming, in its vertical scan direction, narrow areas on a display to be illuminated with an illumination light and scanning the illumination light with a rotating prism in the vertical scan direction, thereby reducing the sample-and-hold blur.

However, the method disclosed in Japanese Patent Laid-Open No. 11-202285 is applicable to a direct-view display apparatus provided with the back lights closely adjacent to a back surface of its liquid crystal panel. Therefore, it is impossible to apply this method to a projector that illuminates a display element with light from a light source through an optical system including a lens and other optical members.

On the other hand, the method disclosed in Japanese Patent Laid-Open No. 2006-308720 consistently scans the illumination light, which may generate consistent flicker in a displayed image. Since, in particular, a projector often displays not only a moving image, but also a still image for a long time, generation of such consistent flicker in the displayed image is undesirable. Moreover, in order to scan the illumination light, an operating mechanism is required which, for example, rotates the rotating prism and optical members attached thereto such as a mirror. Such an operating mechanism increases a size of the projector and a driving sound (noise) and requires maintenance of component parts included therein such as a motor.

For these reasons, this embodiment realizes the illumination optical system 13 making it possible for the image projection apparatus (projector), without moving optical members and generating flicker in still image display, to reduce the sample-and-hold blur generated in moving image display.

Figure 2:
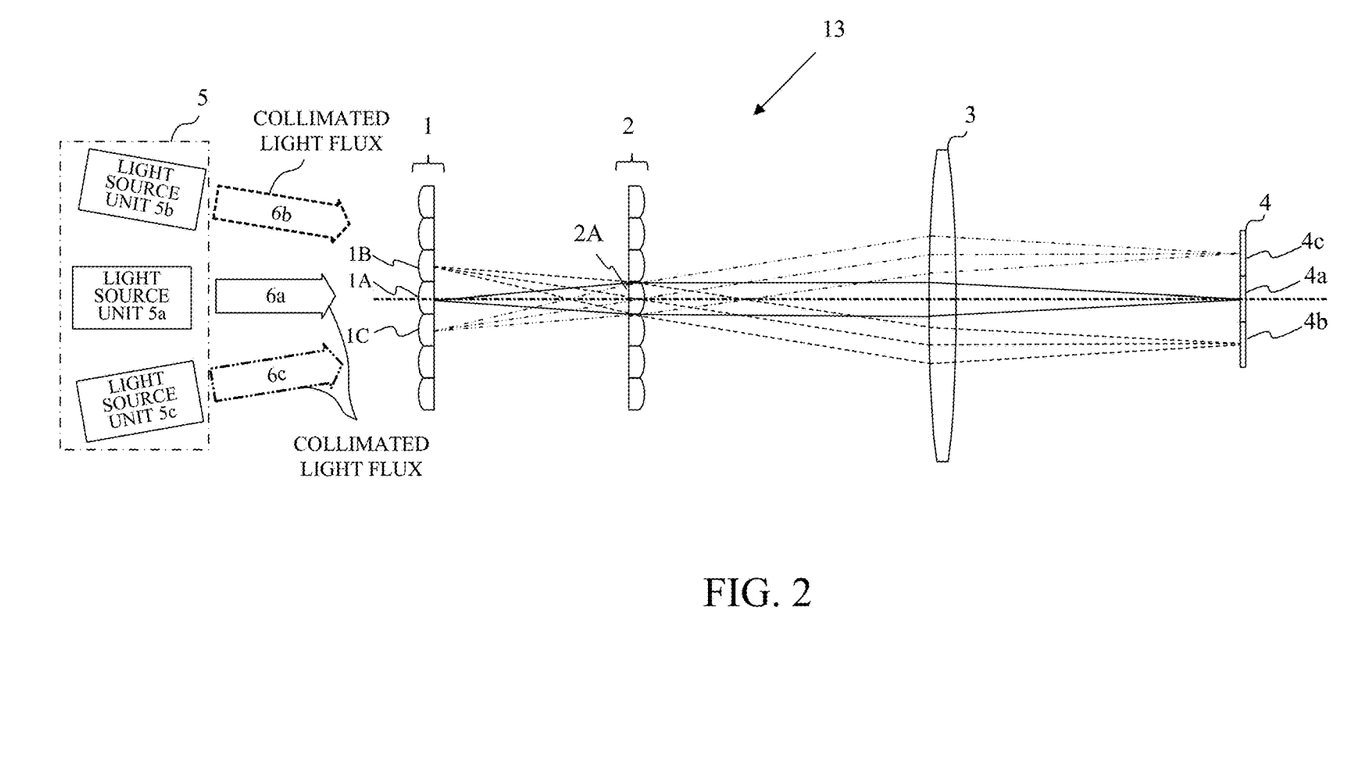
FIG. 2 illustrates a configuration of an illumination optical system used in Embodiment 1.

FIG. 2 illustrates a detailed configuration of the illumination optical system 13. The illumination optical system 13 introduces three illumination light fluxes 6a, 6b and 6c, which are respectively emitted from the three light source units 5a, 5b and 5c included in the light source 5, respectively to each light modulator (4R, 4G and 4B). The illumination light fluxes 6a, 6b and 6c enter the illumination optical system 13 as collimated light fluxes.

The illumination optical system 13 includes, in order from a light-source side, the first fly-eye lens (first lens array) 1, the second fly-eye lens (second lens array) 2 and the condenser lens 3. The first and second fly-eye lenses 1 and 2 each have a configuration in which multiple lens cells are arranged in an up/down direction in FIG. 2. Each lens cell of each of the first and second fly-eye lenses 1 and 2 has a shape homothetic to that of each divided illumination area illustrated in FIG. 7A as viewed from an optical axis direction.

The illumination light fluxes 6a, 6b and 6c emitted from the light source units 5a, 5b and 5c enter each lens cell of the first fly-eye lens 1 at mutually different angles in the up/down direction in FIG. 2 with respect to an optical axis of each of the lens cells (i.e., an optical axis of the illumination optical system 13).

When p represents a pitch of the lens cells of the first fly-eye lens 1 in the area division direction, and f represents a focal length of each lens cell, the illumination light fluxes 6a, 6b and 6c enter each one of the lens cell of the first fly-eye lens with forming the following angle θ between mutually adjacent two illumination light fluxes thereof (that is, between the illumination light fluxes 6a and 6b and between the illumination light fluxes 6a and 6c):

$$\theta = a\tan(p/f).$$

In this embodiment, the illumination light flux 6a enters each lens cell along the optical axis of that lens cell, and the illumination light fluxes 6b and 6c respectively having inclinations forming angles θ on mutually opposite sides with respect to the optical axis enter that lens cell.

The three illumination light fluxes 6a, 6b and 6c entering each lens cell of the first fly-eye lens 1 are condensed (converged) by that lens cell, thereby forming light source images on the second fly-eye lens 2. The light source images will be described with reference to FIGS. 3 and 4.

Figure 3:
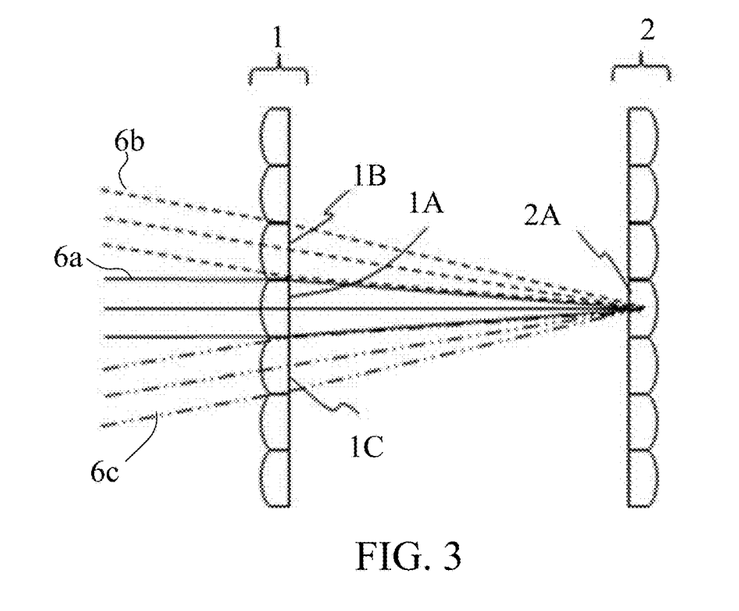
FIG. 3 illustrates formation of a light source image by first and second fly-eye lenses included in the illumination optical system.

FIG. 3 illustrates light source images respectively formed by the illumination light fluxes 6a, 6b and 6c entering one lens cell 2A of the second fly-eye lens 2. The illumination light fluxes 6a, 6b and 6c respectively enter the first fly-eye lens 1 at mutually different angles, which means that the illumination light fluxes 6a, 6b and 6c entering the lens cell 2A of the second fly-eye lens 2 respectively pass through the mutually different lens cells 1A, 1B and 1C of the first fly-eye lens 1. The illumination light flux 6a that is a collimated light flux parallel to an optical axis of the lens cell 1A, enters the lens cell 1A along the optical axis thereof and is then condensed toward the lens cell 2A disposed on the optical axis of the lens cell 1A to form one light source image on the lens cell 2A. The collimated illumination light fluxes 6b and 6c each having the above-described inclination angle θ with respect to the optical axis of the lens cell 1A respectively pass through the lens cells 1B and 1C each adjacent to the lens cell 1A and are then condensed toward the lens cell 2A to respectively form light source images on the lens cell 2A.

Figure 4:
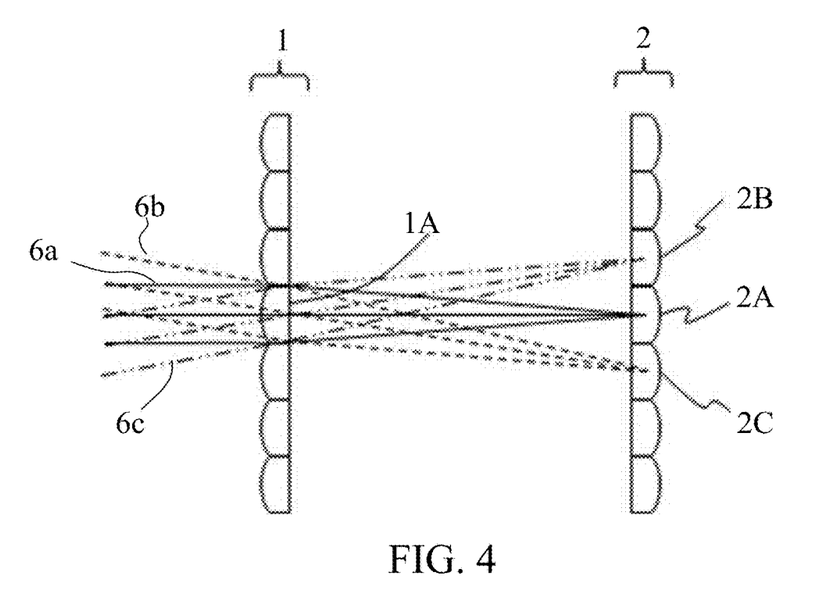
FIG. 4 illustrates formation of light source images by the first and second fly-eye lenses.

On the other hand, FIG. 4 illustrates light source images respectively formed on the second fly-eye lens 2 by the illumination light fluxes 6a, 6b and 6c passing through one lens cell 1A of the first fly-eye lens 1. The illumination light flux 6a passing through the lens cell 1A is condensed toward the lens cell 2A of the second fly-eye lens 2 to form one light source image on the lens cell 2A. Similarly, the illumination light fluxes 6b and 6c passing through the lens cell 1A at the above-described inclination angle θ with respect to the optical axis of the lens cell 1A are respectively condensed toward the lens cells 2C and 2B of the second fly-eye lens 2 each adjacent to the lens cell 2A to respectively form light source images on the lens cells 2C and 2B. As just described, in this embodiment, the illumination light fluxes 6a, 6b and 6c entering each one lens cell of the first fly-eye lens 1 at mutually different angles respectively reach mutually adjacent (different) lens cells of the second fly-eye lens 2 to form the light source images on these lens cells. This configuration is significantly different from that of a fly-eye lens system used in common projectors in which an illumination light flux passing through one lens cell of a first fly-eye lens enters only one corresponding lens cell of a second fly-eye lens to form a light source image thereon.

FIG. 2 illustrates that the illumination light fluxes 6a, 6b and 6c respectively passing through the adjacent lens cells 1A, 1B and 1C of the first fly-eye lens 1 and then passing through the one lens cell 2A of the second fly-eye lens 2 as illustrated in FIG. 4 are respectively imaged in the divided illumination areas 4a, 4b and 4c. As described above, the lens cell 2A of the second fly-eye lens 2 and the condenser lens 3 together form the images of the adjacent lens cells 1A, 1B and 1C of the first fly-eye lens 1, namely, the light source images on the mutually adjacent divided illumination areas 4a, 4b and 4c on the illumination surface 4. This configuration enables individually changing brightnesses (illuminances) of the divided illumination areas 4a, 4b and 4c by varying, that is, controlling the light quantities (light emission intensities) of the respective light source units 5a, 5b and 5c. Varying the light quantity of the light source unit includes switching a state of the light source unit between a lit (light emission) state and an unlit (non-light emission) state. Furthermore, changing the brightness of the divided illumination area includes switching a state of the divided illumination area between an illuminated (illumination-ON) state and a non-illuminated (illumination-OFF) state.

When any one of the three light source units 5a, 5b and 5c becomes the lit state, an illumination light flux from the lit light source unit enters the illumination optical system 13. This entrance of the illumination light flux results in the illumination-ON state of one of the divided illumination areas 4a, 4b and 4c on the light modulator corresponds to the lit light source unit. Conversely, when any one of the light source units becomes the unlit state, no illumination light flux from the unlit light source unit enters the illumination optical system 13, which results in the illumination-OFF state of the divided illumination area corresponding to the unlit light source unit. Furthermore, when the light quantity of the lit light source unit, namely, a light quantity of the illumination light flux from the lit light source unit varies, the brightness of the divided illumination area corresponding to the lit light source unit varies accordingly.

The controller 17 controls the states of the light source units 5a, 5b and 5c by the following control method.

Figure 5A:
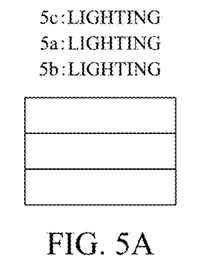
FIGS. 5A to 5D illustrate examples of illumination conditions of an illumination surface in the projector of Embodiment 1.

FIGS. 5A to 5D illustrate brightness patterns, that is, illumination (illumination-ON/OFF state) patterns of the divided illumination areas to be switched. FIG. 5A illuminates a state in which the illumination light fluxes 6a, 6b and 6c emitted from the lit light source units 5a, 5b and 5c bring the divided illumination areas 4a, 4b and 4c into the illumination-ON state and thereby the entire illumination surface is uniformly illuminated. This state is desirable for displaying a still image and does not cause the flicker in the displayed image.

Figure 5B:
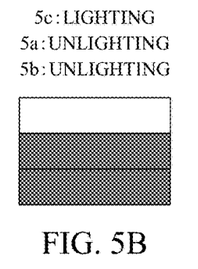
Figure 5C:
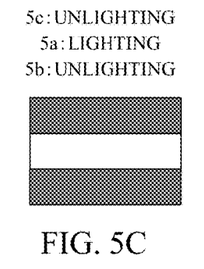
Figure 5D:
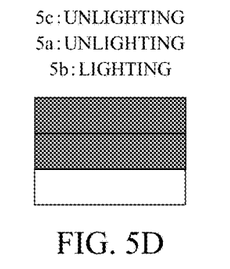

On the other hand, FIGS. 5B to 5D illustrate states in which part (one in the drawings) of the light source units 5a, 5b and 5c is in the lit state and a remaining part (two in the drawings) thereof is in the unlit state. Sequential switching of these states brings one divided illumination area corresponding to the sequentially lit light source unit into the illumination-ON state and brings the remaining two divided illumination areas corresponding to the sequentially unlit light source units into the illumination-OFF state.

Figure 6A:
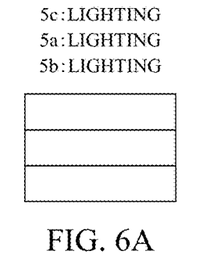
FIGS. 6A to 6D illustrate other examples of the illumination condition of the illumination surface in the projector of Embodiment 1.

FIGS. 6A to 6D illustrate other illumination (illumination-ON/OFF state) patterns of the divided illumination areas to be switched. FIG. 6A illuminates a state in which, as in FIG. 5A, the illumination light fluxes 6a, 6b and 6c emitted from the lit light source units 5a, 5b and 5c bring the divided illumination areas 4a, 4b and 4c into the illumination-ON state and thereby the entire illumination surface is uniformly illuminated. This state is desirable for displaying a still image and does not cause the flicker in the displayed image.

Figure 6B:
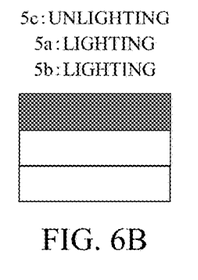
Figure 6C:
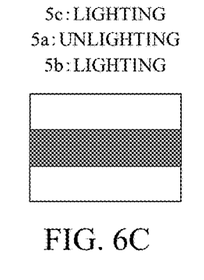
Figure 6D:
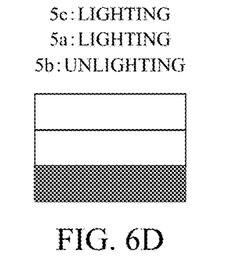

On the other hand, FIGS. 6B to 6D illustrate states in which part (one in the drawings) of the light source units 5a, 5b and 5c is in the unlit state and a remaining part (two in the drawings) thereof is in the lit state. Sequential switching of these states brings one divided illumination area corresponding to the sequentially unlit light source unit into the illumination-OFF state and brings the remaining two divided illumination areas corresponding to the sequentially lit light source units into the illumination-ON state.

The controller 17 lights, in response to input of an image signal of a still image, all the light source units 5a, 5b and 5c to provide the illumination state illustrated in FIG. 5A or 6A. The controller 17 sequentially changes, in response to input of an image signal of a moving image, one or two light source units to be lit and two or one light source unit to be unlit such that the illumination states illustrated in FIG. 5B to 5D or 6B to 6D are sequentially switched within one period of a vertical synchronization signal of the image signal. This switching of the illumination states reduces the sample-and-hold blur, thereby improving a moving image display characteristic. A method of switching the illumination states illustrated in FIGS. 6A to 6D provides a moving image display characteristic improvement effect inferior to that of a method of switching the illumination states illustrated in FIGS. 6B to 6D, but is more advantageous than the latter method in providing a sufficient luminance of the entire projected image. The controller 17 is further capable of, depending on a brightness of the image signal, switching at least one of the lighting/unlighting of each light source unit and controlling the light quantity of each light source unit.

Next, description will be made of the light quantity control performed on the light source units 5a, 5b and 5c on the basis of the above-described leakage light detection. In this embodiment, the light quantity control corrects variations in light quantities (luminances) of the light source units 5a, 5b and 5c due to temperature change and the like such that the three divided illumination areas 4a, 4b and 4c are illuminated at mutually approximately equal brightnesses. The controller 17 constituted by a computer executes the light quantity control illustrated in FIG. 8 according to a computer program. The light quantity of each light source unit (5a, 5b and 5c) is detected, in a state in which any one of the light source units is in the lit state and the other two thereof are in the unlit state, by the illuminance sensor 12. The illuminance sensor 12 detects the illuminance of the leakage light from the illumination light flux (light after passing through each light modulator) emitted from the lit light source unit.

Figure 8:
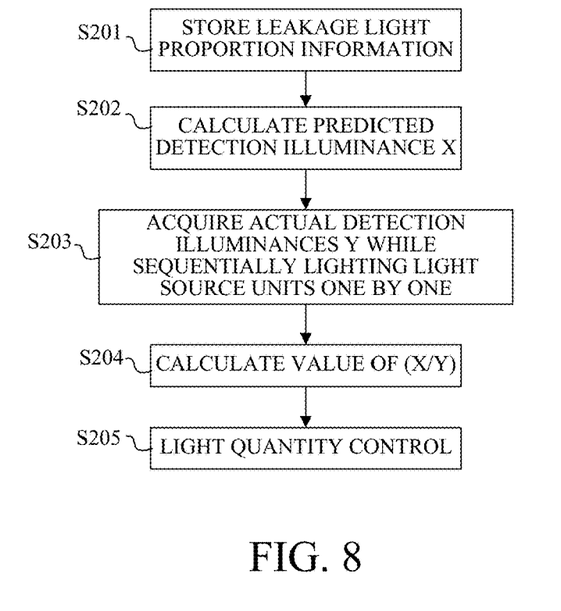
FIG. 8 is a flowchart illustrating a procedure of light quantity control in Embodiment 1.

At step S201, the controller 17 measures in advance, in a state of lighting any one of the light source units and unlighting the other two light source units in response to a predetermined input image signal with predetermined light emission conditions, a proportion of the leakage light to the light entering the color combination prism 9. The predetermined light emission conditions include temperature, a driving current of each light source unit and the like. The controller 17 stores a result of the measurement as leakage light proportion information in a memory included in the controller 17.

Next, at step S202, the controller 17 calculates, from a current input image signal, an illuminance X of the leakage light which is predicted to be detected by the illuminance sensor 12 when an illumination light flux supposed to enter the color combination prism 9 enters that prism 9 in a state of lighting only one light source unit. The controller 17 uses the leakage light proportion information for this calculation. The illuminance X of the leakage light which is predicted to be detected by the illuminance sensor 12 is hereinafter referred to as "a predicted detection illuminance".

Next, at step S203, the controller 17 acquires, by sequentially lighting the light source units one by one (and unlighting the other two light source units), actual detection illuminances Y that are actual illuminance detection results obtained by the illuminance sensor 12.

At step S204, the controller 17 calculates a value of (X/Y) as a difference (proportion) between the predicted detection illuminance X and the actual detection illuminance Y for each lit light source unit. The value of (X/Y) corresponds to the above-described information on light quantity. For instance, when the predicted detection illuminance X is supposed to be acquired for the input image signal in a state where only the light source unit 5c is in the lit state as illustrated in FIG. 5B and the actual detection illuminance Y is actually acquired by the illuminance sensor 12, an actual light quantity of the light source unit 5c is deemed to have a difference (X/Y) from a normal light quantity of the light source unit 5c. In this manner, the controller 17 acquires the value of (X/Y) as information on the difference of the actual light quantity from the normal light quantity (information on light quantity) for each lit light source.

At step S205, the controller 17 controls the light quantity of each of the light source units 5a, 5b and 5c so as to decrease a value of (X−Y) of each of the light source units 5a, 5b and 5c and to decrease differences of the values of (X/Y) between the light source units 5a, 5b and 5c. For instance, when the value of (X/Y) of one light source unit is higher than those of the other two light source units (in other words, when the actual detection illuminance Y is lower than the predicted detection illuminance X), the controller 17 performs light quantity control (light emission control) to increase the light quantity of the one light source unit. On the other hand, when the values of (X/Y) of two light source units are higher than that of the other one light source unit, the controller 17 performs light quantity control to increase the light quantities of the two light source units. Even when the light quantity of part of the multiple (three) light source units 5a, 5b and 5c is varied depending on the values of (X−Y) and (X/Y) as described above, expression "control the light quantities of the multiple light source units" is used. The light quantity control can be performed by changing the driving current, a driving voltage, a light emission duty ratio or the like for each light source unit.

As described above, this embodiment detects the light quantities of the respective light source units by utilizing the leakage light that is not used for the image projection and controls the light quantities of the light source units depending on the detection results. Therefore, this embodiment enables suppressing variations in light quantities between the light source units without a cost increase, a decrease in detection accuracy for the light quantity of each light source unit, an increase in size of the apparatus and a decrease in brightness of the projected image. Moreover, this embodiment enables, since it is sufficient to include one illuminance sensor 12 regardless of the number of the light source units, avoiding the increase in size of the projector and the cost increase.

Moreover, this embodiment does not require, since the light quantity detection (leakage light illuminance detection) for reducing the sample-and-hold blur in moving image display is performed during sequential lighting of the multiple light source units, input of a special image signal to be used exclusively for the detection. That is, this embodiment enables the controller 17 to perform the leakage light illuminance detection while displaying a user set projected image (still image or moving image) on the screen and to control the multiple light source units. Thus, this embodiment enables, since it is not necessary to display on the screen a sample image or the like to be used exclusively for the leakage light illuminance detection, increasing convenience for a user, compared to a case where such a sample image or the like is displayed immediately after start-up of the projector.

Furthermore, this embodiment detects the leakage light with the illuminance sensor 12 at the color combination prism 9 placed immediately preceding the projection optical system 15 as a final optical system on the optical path 16 of the projection light. Therefore, this embodiment enables control to correct the light quantities of the light source units so as to also compensate for a decrease in intensity of the projection light caused by optical component parts and the light modulators both constituting the projector, which makes it possible to provide a high correction effect.

Although this embodiment described the case where number of the divided illumination areas is three, the light quantity control described with reference to FIGS. 5B to 5D and FIG. 9 can be applied also to a case where the number of the divided illumination areas is two.

In addition, the illuminance sensor 12 may serve also as a flicker detector that detects flicker (periodic brightness variation caused by inversion drive of the liquid crystal panel) generated in the light modulators 4R, 4G and 4B. Using the illuminance sensor 12 also as the flicker detector enables detecting the light quantity and the flicker of each light source unit by using a same sensor, which contributes to a reduction in size of the projector and a cost reduction.

That is, in this embodiment, the controller 17 controls the light quantities of the multiple light source units depending on information acquired from the detection result of the non-projection light component when one of the multiple light source units is lit (that is, in the lit state) and the others thereof are unlit (that is, in the unlit state).

Specifically, this embodiment includes, as the multiple light source units, a first light source unit, a second light source unit and a third light source unit respectively corresponding to the mutually different multiple divided illumination areas. With this configuration, the controller 17 controls a light quantity of the first light source unit depending on information on light quantity for the first light source unit acquired from a detection result of a non-projection light component when the first light source unit is lit and the other light source units are unlit. In addition, the controller 17 controls a light quantity of the second light source unit depending on information on light quantity for the second light source unit acquired from a detection result of a non-projection light component when the second light source unit is lit and the other light source units are unlit. Moreover, the controller 17 controls a light quantity of the third light source unit depending on information on light quantity for the third light source unit acquired from a detection result of a non-projection light component when the third light source unit is lit and the other light source units are unlit.

Furthermore, the controller 17 controls the light quantities of the multiple light source units depending on information acquired from the detection result of the non-projection light component acquired when all the multiple light source units are lit and from the detection result of the non-projection light component acquired when two (or more) of the multiple light source units are lit. Specifically, as mentioned above, this embodiment includes, as the multiple light source units, the first, second and third light source units corresponding to the mutually different multiple divided illumination areas. With this configuration, the controller 17 controls the multiple light source units depending on the detection result of the non-projection light component acquired when all the multiple light source units are lit and the detection result of the non-projection light component acquired when two (or more) of the multiple light source units are lit and one thereof is unlit (for example, when the first and second light source units are lit and the third light source unit is unlit).

Embodiment 2

Next, description will be made of a second embodiment (Embodiment 2) of the present invention with reference to FIGS. 6A to 6D. This embodiment will be describe, as a different method from that in Embodiment 1, a method of controlling the light quantities of the light source units 5a, 5b and 5c depending on leakage light detection result. Also this embodiment corrects the variations in light quantities between the light source units 5a, 5b and 5c due to the temperature change and the like such that the three divided illumination areas 4a, 4b and 4c are illuminated at mutually equal brightnesses. The controller 17 constituted by a computer executes light quantity control illustrated in FIG. 9 according to a computer program.

Figure 9:
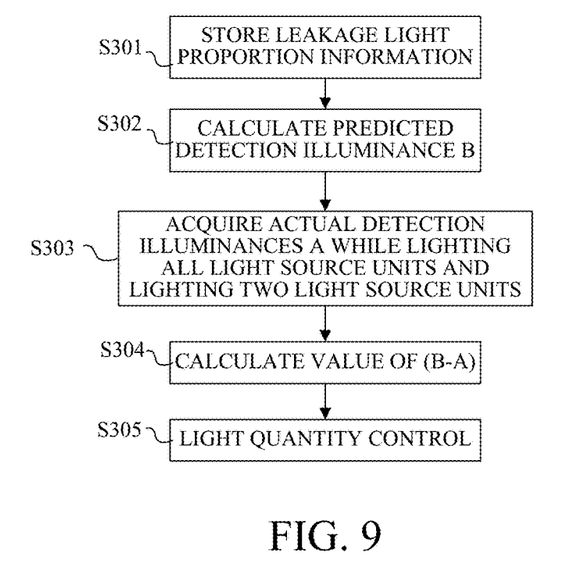
FIG. 9 is a flowchart illustrating a procedure of light quantity control in Embodiment 2 of the present invention.

The light quantity of each light source unit is detected, in a state in which all the light source units are in the lit state and in a state in which any one of the light source units is in the unlit state and the other two thereof are in the lit state, by the illuminance sensor 12. The illuminance sensor 12 detects an illuminance of a leakage light from an illumination light flux (light after passing through each light modulator) emitted from each light source unit.

At step S301, the controller 17 measures in advance, in a state of unlighting any one of the light source units and lighting the other two light source units in response to a predetermined input image signal with predetermined light emission conditions, a proportion of the leakage light to the light entering the color combination prism 9. The predetermined light emission conditions include, as described in Embodiment 1, the temperature, the driving current of each light source unit and the like. The controller 17 stores a result of the measurement as leakage light proportion information in the memory included in the controller 17.

Next, at step S302, the controller 17 calculates, from a current input image signal, an illuminance (predicted detection illuminance) B of the leakage light which is predicted to be detected by the illuminance sensor 12 when illumination light fluxes supposed to enter the color combination prism 9 enter that prism 9 in a state of lighting only two light source units. The controller 17 uses the leakage light proportion information for this calculation.

Next, at step S303, the controller 17 acquires an actual detection illuminances A1 to A3 that are actual illuminance detection results obtained by the illuminance sensor 12. Specifically, the controller 17 first acquires the actual detection illuminance A1 by the illuminance sensor 12 in a state in which all the light source units 5a, 5b and 5c are in the lit state as illustrated in FIG. 6A. Similarly, the controller 17 acquires actual detection illuminances A2 and A3 by the illuminance sensor 12 in two states in each of which any one of the light source units 5a, 5b and 5c is in the unlit state and the other two thereof are in the lit state as illustrated in any two of FIGS. 6B to 6D. Thereafter, the controller 17 calculates an actual detection illuminance A of one light source unit that was unlit by using the actual detection illuminances A1, A2 and A3 with following expression (1):

$$A=[(A2)+(A3)-1\times(A1)]/2 \tag{1}$$

When number N of the divided illumination areas is three, it is possible to acquire the actual detection illuminance A with expression (1). On the other hand, when the number N is four, the controller acquires, by the illuminance sensor 12, actual detection illuminances A1, A2, A3 and A4 in a state in which all the light source units are in the lit state and in three states in each of which any one thereof is in the unlit state and the other three thereof are in the lit state. Thereafter, the controller 17 calculates an actual detection illuminance A of the light source unit that was unlit with following expression (2):

$$A=[(A2)+(A3)+(A4)-2\times(A1)]/3 \quad (2)$$

Furthermore, when the number N is five, the controller 17 acquires, by the illuminance sensor 12, actual detection illuminances A1, A2, A3, A4 and A5 in a state in which all the light source units are in the lit state and in four states in each of which any one thereof is in the unlit state and the other four thereof are in the lit state. Thereafter, the controller 17 calculates an actual detection illuminance A of the light source unit that was unlit with following expression (3):

$$A=[(A2)+(A3)+(A4)+(A5)-3\times(A1)]/4 \quad (3)$$

When the number N is equal to or more than six, performing a similar calculation to that described above can provide an actual detection illuminance A of the light source unit that was unlit.

In this manner, the controller 17 performs the illuminance detection multiple times by the illuminance sensor 12 while lighting all the light source units 5a, 5b and 5c and sequentially unlighting them one by one. Then, the controller 17 calculates the actual detection illuminance A of each light source unit by using the detection results acquired through the multiple detections.

Next, at step S304, the controller 17 calculates a value of (B−A) as a difference between the predicted detection illuminance B and the actual detection illuminance A of each light source unit. This value of (B−A) corresponds to information on light quantity. For instance, when the actual detection illuminance A and the predicted detection illuminance B are acquired for the light source unit 5c, an actual light quantity of the light source unit 5c is deemed to have, from a normal light quantity thereof, a difference corresponds to a value obtained by dividing the value of (B−A) by the leakage light proportion information (%). In this manner, the controller 17 acquires the value of (B−A) as information on the difference of the actual light quantity from the normal light quantity (information on light quantity) for each light source.

At step S305, the controller 17 controls the light quantity of each of the light source units 5a, 5b and 5c so as to decrease the value of (B−A) and to decrease differences of the values of (B/A) between the light source units 5a, 5b and 5c. For instance, when the value of (B/A) of one light source unit is higher than those of the other two light source units (in other words, when the actual detection illuminance A is lower than the predicted detection illuminance B), the controller 17 performs light quantity control (light emission control) to increase the light quantity of the one light source unit. On the other hand, when the values of (B/A) of two light source units are higher than that of the other one light source unit, the controller 17 performs light quantity control to increase the light quantities of the two light source units. Even when the light quantity of part of the multiple (three) light source units 5a, 5b and 5c is varied depending on the values of (B−A) and (B/A) as described above, expression "control the light quantities of the multiple light source units" is used. The light quantity control can be performed by, as described in Embodiment 1, changing the driving current, the driving voltage, the light emission duty ratio or the like for each light source unit.

As described above, as well as Embodiment 1, this embodiment also detects the light quantities of the respective light source units by utilizing the leakage light that is not used for the image projection and controls the light quantities of the light source units depending on the detection results. Therefore, this embodiment enables suppressing variations in light quantities between the light source units without a cost increase, a decrease in detection accuracy for the light quantity of each light source unit, an increase in size of the apparatus and a decrease in brightness of the projected image. Moreover, this embodiment also enables, since it is sufficient to include one illuminance sensor 12 regardless of the number of the light source units, avoiding the increase in size of the projector and the cost increase.

Moreover, this embodiment also does not require, since the light quantity detection (leakage light illuminance detection) for reducing the sample-and-hold blur in moving image display is performed during sequential lighting of the multiple light source units, input of a special image signal to be used exclusively for the detection.

Furthermore, this embodiment also detects the leakage light with the illuminance sensor 12 at the color combination prism 9 placed immediately preceding the projection optical system 15 as a final optical system on the optical path 16 of the projection light. Therefore, this embodiment enables control to correct the light quantities of the light source units so as to also compensate for a decrease in intensity of the projection light caused by optical component parts and the light modulators both constituting the projector, which makes it possible to provide a high correction effect.

Embodiment 3

Next, description will be made of a third embodiment (Embodiment 3) of the present invention. In the light source including the light source units 5a to 5c illustrated in FIG. 7B, the light-emitting elements shown by the black-filled circles are arranged more inside (center side) than the light-emitting elements shown by the white-filled circles. In the following description, the light-emitting elements shown by the black-filled circles are each referred to as "an inner light-emitting element", and the light-emitting elements arranged more outside (peripheral side) than the inner light-emitting elements and shown by the white-filled circles are each referred to as "an outer light-emitting element".

In such a case where the light source includes the inner light-emitting elements and the outer light-emitting elements as illustrated in the drawing, even when all the inner and outer light-emitting elements emit light under mutually identical conditions, a temperature rise amount of the inner light-emitting elements is greater than that of the outer light-emitting elements. This is because the inner light-emitting elements are affected by heat generated from the outer light-emitting elements in addition to heat generated by themselves.

Semiconductor light-emitting elements such as a laser diode and an LED are affected by temperature rise and thereby, even when driven under identical conditions, their light-emission efficiency and their light quantity are decreased. Moreover, a long-time drive of the semiconductor light-emitting elements at high temperature shortens their life.

Even when the light-emitting elements in each light source unit (e.g., the light source unit 5a) have mutually different light quantities, the configuration described in Embodiment 1 enables the first and second fly-eye lenses 1 and 2 to provide a uniform light intensity. For this reason, the brightness of the divided illumination area (e.g., the divided illumination area 4a) corresponding to the above light source unit is not significantly affected by the light quantity difference. However, if one or more light-emitting elements in the light source unit (hereinafter referred to as "a degraded light source unit") cannot be lit due to their end of life, an entire light quantity of the degraded light source unit, that is, an entire light quantity of the illumination light flux from the degraded light source unit decreases, which decreases the brightness of the divided illumination area (hereinafter referred to as "a darkened divided illumination area") corresponding to the degraded light source unit. This brightness decrease consequently causes the controller 17 to decrease the light quantity of each of the other light source units (e.g., the light source units 5b and 5c) in order to prevent the brightnesses of the other illumination areas (e.g., the divided illumination areas 4b and 4c) from being different from that of the darkend divided illumination area. This results in a decrease in brightness of the entire light modulator, leading to a decrease in brightness of a projected image.

For this reason, in this embodiment, of the multiple light-emitting elements in the light source, each of the inner light-emitting elements arranged more inside than the outer light-emitting elements is configured to have a light quantity different from that of each of the outer light-emitting elements. Specifically, the controller 17 performs light quantity control such that, in order for the multiple light source units to have a uniform temperature rise amount, the light quantity of each inner light-emitting element becomes lower than that of each outer light-emitting element. Since the inner light-emitting elements are surrounded by the outer light-emitting elements, when the light quantities of the inner and outer light-emitting elements are mutually identical, a temperature of each inner light-emitting element is more prone to be increased as compared to the outer light-emitting elements, which is likely to shorten the life of the inner light-emitting element. In order to solve this problem, the light quantity control to lower the light quantity of each inner light-emitting element to less than that of each outer light-emitting element enables increasing the life of each inner light-emitting element, as compared to the case where the light quantities of the inner and outer light-emitting elements are mutually identical. The light quantity control can be performed, as described in Embodiments 1 and 2, by changing the driving current, the driving voltage, the light emission duty ratio and the like of each light-emitting element. The "inner light-emitting element" means each of all or part of light-emitting elements surrounded on all sides by other light-emitting elements. For instance, when there are a total of nine light-emitting elements arranged in a three-by-three matrix, one thereof located at their center is the inner light-emitting element. Similarly, when there are a total of sixteen light-emitting elements arranged in a four-by-four matrix, all or part of four thereof located near their center are the inner light-emitting elements.

In this embodiment, symbol ● (black-filled circle) denotes the inner light-emitting element, and symbol ○ (white-filled circle) denotes the outer light-emitting element, both of which are illustrated in FIG. 7B.

This embodiment enables suppressing an adverse effect caused by the shortening of the life of each light-emitting element due to a temperature distribution in the light source (or in each light source unit) and reducing a decrease in luminance of the projected image.

A configuration may be employed in which, in a light source unit, light-emitting elements closer to a centroid of the light source unit have a lower light quantity.

Embodiment 4

As a countermeasure against a problem that the temperature rise amount of the inner light-emitting element is larger than that of the outer light-emitting element which was described in Embodiment 3, a fourth embodiment (Embodiment 4) will be described with reference to FIG. 10.

Figure 10:
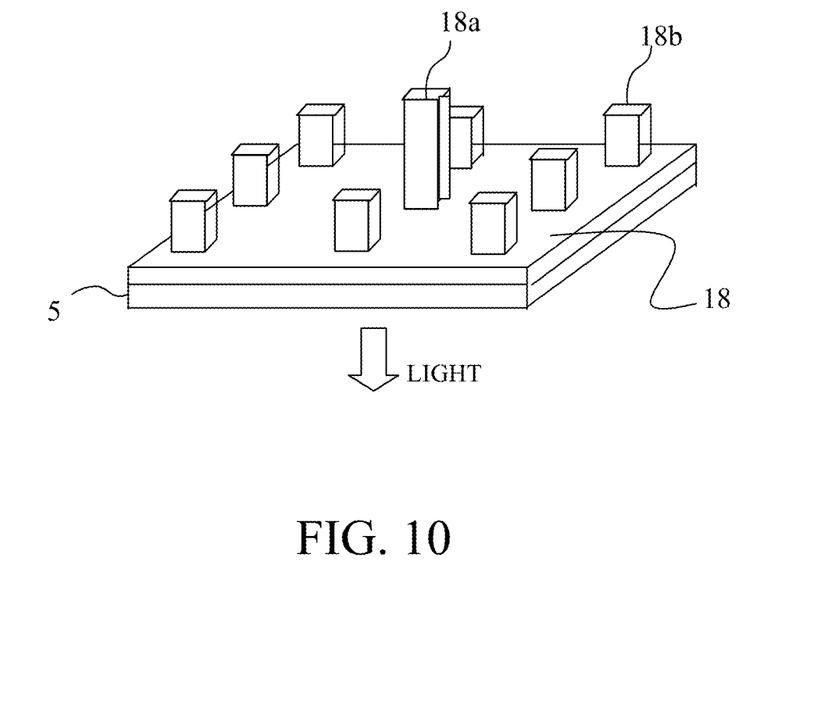
FIG. 10 illustrates a cooling structure for light source units in a projector that is Embodiment 4 of the present invention.

FIG. 10 illustrates a heat sink 18 as a cooler provided on a side (hereinafter referred to as "a reverse side") opposite to a light-emitting-element side (a light-exiting side shown by an arrow) in the light source 5. At multiple locations on the heat sink 18, fins 18a and 18b are provided. The fins 18a provided on the reverse side of the inner light-emitting elements have a height higher than that of the fins 18b provided on the reverse side of the outer light-emitting elements. That is, the heat sink 18 has a stronger cooling effect on the inner light-emitting elements, as compared to a cooling effect on the outer light-emitting elements. This configuration enables uniforming the temperature rise amount in the light source 5.

The cooling effect on the inner light-emitting elements may be set stronger than the cooling effect on the outer light-emitting elements by using a cooling structure other than the heat sink 18. Moreover, cooling by liquid may be performed in addition to or alternatively to the cooling by air.

Each of the above-described embodiments controls the light quantity of the multiple light source units depending on the detection results of the non-projection light component contained in the light flux from each of the light source units, the non-projection light component being not used for the image projection. For this reason, each of the above-described embodiments enables suppressing variations in light quantities between the light source units without a cost increase, a decrease in detection accuracy for the light quantity of each light source unit, an increase in size of the projector and a decrease in brightness of the projected image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077917, filed on Apr. 4, 2014, which is hereby incorporated by reference herein in its entirety.

What is claimed is:
1. An image projection apparatus comprising:
   a light modulator configured to perform modulation of light based on an image signal, the light modulator having a first divided illumination area and a second divided illumination area;
   a projection optical system configured to project the light modulated by the light modulator;
   a light detector configured to detect a non-projection light component that is not projected through the projection optical system;
   a first light source unit corresponding to the first divided illumination area;

a second light source unit corresponding to the second divided illumination area;

an illumination optical system configured to illuminate:
the first divided illumination area and the second divided illumination area at the same time when the first and second light source units are lit; and
only the first divided illumination area, among the first and second divided illumination areas, when the first light source unit is lit and the second light source unit is unlit; and a light source controller configured to control light quantities of the first and second light source units:
to change illuminances of the first and second divided illumination areas independently so that a difference between a brightness at the first divided illumination area and a brightness at the second divided illumination area becomes smaller depending on a detection result of the light detector.

2. The image projection apparatus according to claim 1, wherein the light detector is configured to detect the non-projection light component obtained from the light proceeding from the light modulator toward the projection optical system.

3. The image projection apparatus according to claim 2, wherein the light detector is configured to detect flicker generated in the light modulator.

4. The image projection apparatus according to claim 1, wherein the light source controller is configured to control the light quantities of the first and second light source units depending on information acquired from the detection result of the non-projection light component corresponding to when one of the first or second light source unit is lit and the other thereof is unlit.

5. The image projection apparatus according to claim 1, wherein the light source controller is configured to control the light quantities of the first and second light source units depending on information acquired from (a) the detection result of the non-projection light component corresponding to when both the first and second light source units are lit and (b) the detection result of the non-projection light component corresponding to when one of the first or second light source unit is lit.

6. The image projection apparatus according to claim 1, wherein:
the first and second divided illumination areas are divided vertically in a scanning direction of the light modulator, and
the light source controller is configured to sequentially change, of the multiple light source units, one of the first or second light source unit to be lit and one of the first or second light source unit to be unlit within one period of a vertical synchronization signal of the image signal.

7. The image projection apparatus according to claim 1, wherein:
each of the first and second light source units includes multiple light-emitting elements, and
the light source controller is configured to provide, when causing the multiple light-emitting elements to emit lights, a difference in light quantity of at least one inner light-emitting element of the multiple light-emitting elements from those of outer light-emitting elements thereof, the at least one inner light-emitting element being disposed more inside than the outer light-emitting elements in each light source unit.

8. The image projection apparatus according to claim 1, wherein:
each of the first and second light source units includes multiple light-emitting elements and a cooler, and
the cooler has a stronger cooling action for at least one inner light-emitting element of the multiple light-emitting elements than that for outer light-emitting elements thereof, the at least one inner light-emitting element being disposed more inside than the outer light-emitting elements in each light source unit.

9. The image projection apparatus according to claim 1, wherein:
the illumination optical system comprising a first lens array including multiple lens cells and a second lens array including multiple lens cells, and
the illumination optical system is configured such so that multiple light fluxes entering each one of the multiple lens cells of the first lens array at mutually different angles enter mutually different lens cells of the multiple lens cells of the second lens array.

10. A method of controlling an image projection apparatus, the apparatus comprising a light modulator configured to perform modulation of light based on an image signal, the light modulator having a first divided illumination area and a second divided illumination area; a projection optical system configured to project the light modulated by the light modulator, first and second light source units provided corresponding to the first and second divided illumination areas; and an illumination optical system configured to illuminate the first and second divided illumination areas at the same time when the first and second light source units are lit and illuminates only the first divided illumination area, among the first and second divided illumination areas, when the first light source unit is lit and the second light source unit is unlit, the method comprising the steps of:
controlling light quantities of the first and second light source units to change illuminances of the first and second divided illumination areas independently;
detecting a non-projection light component that is not projected through the projection optical system; and
controlling the light quantities of the first and second light source units so that a difference between a brightness at the first divided illumination area and a brightness at the second divided illumination area becomes smaller depending on a detection result of the detecting step.

* * * * *